US008807900B2

(12) United States Patent
Ramsauer

(10) Patent No.: US 8,807,900 B2
(45) Date of Patent: Aug. 19, 2014

(54) SNAP FASTER

(76) Inventor: Dieter Ramsauer, Schwelm (DE)

( * ) Notice: Subject to any disclaimer, the term of this patent is extended or adjusted under 35 U.S.C. 154(b) by 0 days.

(21) Appl. No.: 13/514,504

(22) PCT Filed: Oct. 23, 2010

(86) PCT No.: PCT/EP2010/006495
§ 371 (c)(1),
(2), (4) Date: Jun. 20, 2012

(87) PCT Pub. No.: WO2011/069579
PCT Pub. Date: Jun. 16, 2011

(65) Prior Publication Data

US 2013/0025094 A1 Jan. 31, 2013

(30) Foreign Application Priority Data

Dec. 8, 2009 (DE) ..................... 20 2009 016 632 U

(51) Int. Cl.
*F16B 21/00* (2006.01)

(52) U.S. Cl.
USPC ............................ 411/347; 411/508; 411/549

(58) Field of Classification Search
USPC ........ 411/24, 25, 28, 45–48, 59, 60.1, 63, 68, 411/341, 342, 347, 549, 552, 508–509, 411/913; 24/289, 297, 453, 581.1, 594.11
See application file for complete search history.

(56) References Cited

U.S. PATENT DOCUMENTS

| | | | | |
|---|---|---|---|---|
| 2,696,138 | A | 12/1954 | Olschwang | |
| 4,506,419 | A * | 3/1985 | Mitomi | 24/297 |
| 4,865,505 | A * | 9/1989 | Okada | 411/512 |
| 4,902,181 | A | 2/1990 | Moulton | |
| 4,927,287 | A * | 5/1990 | Ohkawa et al. | 403/408.1 |
| 4,952,106 | A * | 8/1990 | Kubogochi et al. | 411/48 |
| 6,074,150 | A * | 6/2000 | Shinozaki et al. | 411/508 |
| 6,364,586 | B1 * | 4/2002 | Okada | 411/41 |
| 7,207,759 | B2 * | 4/2007 | Kato | 411/45 |
| 7,300,089 | B2 * | 11/2007 | Kuroda | 296/39.1 |
| 7,374,200 | B2 * | 5/2008 | Ikeda et al. | 280/728.2 |
| 7,415,751 | B2 * | 8/2008 | Kato et al. | 24/289 |
| 7,607,875 | B2 * | 10/2009 | Shinozaki et al. | 411/45 |
| 2008/0298925 | A1 * | 12/2008 | Shinozaki | 411/48 |

FOREIGN PATENT DOCUMENTS

| | | |
|---|---|---|
| DE | 87 07 084 | 12/1987 |
| DE | 20 2006 013666 | 11/2006 |
| FR | 2 789 454 | 8/2000 |
| WO | WO 89/07719 | 8/1989 |
| WO | WO 2008/128560 | 10/2008 |

* cited by examiner

*Primary Examiner* — Roberta Delisle
(74) *Attorney, Agent, or Firm* — Frommer Lawrence & Haug LLP

(57) ABSTRACT

Snap fastener for fastening a first thin wall to a second thin wall, having a base part to be arranged in a through-opening of the first thin wall. A head part extends away from the base part. The head part presents a guide for two holding elements which are pressed by a spring so that they project out over the end of the guide. The head part includes a housing with fastening projections, and can be snapped into the through-opening so that it grips only one thin wall. Unlocking devices, via which the holding elements can be pulled back into the housing from the front, are provided in the housing. The holding elements are formed by the ends of a two-armed lever which is held on a shaft in the housing so as to be rotatable at an angle of approximately 45 to 90 degrees against spring force.

19 Claims, 2 Drawing Sheets

A
A
B
B

A-A

B-B
C
C
23
26
30
52

C-C
68
28
88

10
20
22
42
24

92
90
42
24
50
70
58

86
18
42

SNAP FASTER

BACKGROUND OF THE INVENTION

The present application claims priority from PCT Patent Application No. PCT/EP2010/006495 filed on Oct. 23, 2010, which claims priority from German Patent Application No. DE 20 2009 016 632.5 filed on Dec. 8, 2009, the disclosures of which are incorporated herein by reference in their entirety.

BACKGROUND OF THE INVENTION

1. Field of the Invention

The invention is directed to a snap fastener suitable for fastening a first thin wall such as a housing wall, door leaf, shutter, or the like, which is provided with a through-opening, to a second thin wall such as a thin-walled wall support such as a housing frame, door frame, wall opening edge, or the like, which is likewise provided with a through-opening, having a base part which can be arranged at the first (or second) thin wall in the through-opening thereof, having a head part extending away from this base part, this head part having in its longitudinal section a diameter which initially increases and then decreases again from the end of the head part in direction of the base part, which head part presents a male plug-in piece which, by overcoming a spring force acting radially outward in direction of the diameter, can be received by an undercut female plug-in piece which is formed by or supported by the through-opening of the thin wall, wherein the head part presents a guide or receptacle for one or two holding elements which are pressed by at least one spring into a position in which they project out over the end of the guide or receptacle, the ends of which holding elements projecting out of the guide or receptacle have a triangular shape in a projection line extending perpendicular to the thin wall with a diagonal run-in surface and a holding surface which is substantially perpendicular to the latter, wherein the base part is formed by a plate overlapping at least two oppositely located edges (longitudinal edges or transverse edges) of the through-opening in the thin wall, wherein the head part is provided as a housing with fastening projections such as fastening knobs (in case of flexible material) or leaf spring devices having flexible fastening surfaces, which housing can be snapped into a through-opening aperture in the thin wall in such a way that it grips only one thin wall (rear panel) and that unlocking devices (releasing means) are provided in the housing, by means of which unlocking devices the holding elements can be pulled back into the housing from the front, and that the housing can be disengaged from the other thin wall (front panel), wherein the dimensions between the holding area of the fastening projections and those of the holding elements on one hand and of the support plane of the base part on the other hand are selected in such a way that the fastening projections lie upon the front panel with clearance when the holding elements are pulled back.

2. Description of Related Art

It is noted that citation or identification of any document in this application is not an admission that such document is available as prior art to the present invention.

A snap fastener of the type mentioned above is already known from WO 2008/128560 A1.

It is noted that in this disclosure and particularly in the claims and/or paragraphs, terms such as “comprises”, “comprised”, “comprising” and the like can have the meaning attributed to it in U.S. patent law; e.g., they can mean “includes”, “included”, “including”, and the like; and that terms such as “consisting essentially of” and “consists essentially of” have the meaning ascribed to them in U.S. patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

It is the object of the invention to provide another design for the holding elements.

The above-stated object is met in that the holding elements are formed by the ends of a two-armed lever which is held on a shaft in the housing so as to be rotatable at an angle of approximately 45 to 90 degrees against spring force.

By means of this step, for example, the quantity of structural component parts required for the fastener according to the invention is reduced because only one lever is required instead of two push elements. In the prior art, two holding elements carry out opposed translational linear movements against spring force or with the support of spring force, respectively, during the fastening process and unlocking process. Accordingly, unlocking by means of a key requires that the rotational movement of the key be transformed into translational movement of the holding elements, which increases the force required for unlocking because of jamming occurring between the slide-shaped holding element and the guide thereof. In contrast, the rotational movement of the lever which forms or carries the two holding elements at its ends takes place without the occurrence of jamming. Further, with high vibration loading, jamming processes of this kind can lead to an unintended loosening of the snap fastener in the slide-shaped prior art, which does not occur in the lever-shaped design according to the invention. A further development of the invention is characterized in that a spring, such as a coil spring, extending around the shaft is provided for generating the spring force, one end of which spring is fixed in an aperture arranged in the vicinity of the shaft, while the other end is fixed in the housing supporting the shaft. This also results in a simplification over the prior art which requires two coil springs.

The prior art has the further disadvantage that when fastening one wall part to another wall part with a plurality of snap fasteners of the type mentioned above it can be very difficult to simultaneously position the snap fasteners in such a way as to allow one wall part to be removed from the other wall part.

The problem can be solved, according to the invention, in that a compression spring, particularly a coil spring or a concave leaf spring such as a spring washer, is arranged between the support surface of the base part and the associated edge plane of the thin wall (front surface). In this way, the snap fastener is automatically pressed into a position that allows one wall to be removed from the other without having to pay close attention to the individual snap fasteners.

By means of this compression spring such as a spring washer, a greater range of play is also bridged in that play can also be balanced between the compression spring and coil spring. The spring-supported play can also be used with closures in electrical installations to allow the door or shutter to be lifted up to permit occurring gases to escape or to relieve pressure. It is also possible for panels of different thickness to be accurately fastened to one another without changing the snap fastener.

According to another further development of the invention, the shaft of a head screw bolt is provided with a pivot bearing surface in the vicinity of the head for rotational bearing support in the base part, with a prism-shaped middle region for mounting the two-armed lever in a rotationally rigid manner, and with a screw thread at the base part for receiving a nut.

Further, as a result of the spring washer, the spring protrudes into the snap fastener far enough without the base part projecting out far that it need not be pulled out any farther in order to remove one thin wall from the other thin wall. Further, the spring enlarges the clamping area. This has the additional advantage that it furnishes a means for checking that the walls have been successively connected because, if the hold should fail, this spring pushes the snap fastener back out again, thereby showing that it has not engaged.

The nut mentioned above can also hold the U-shaped spring by means of a washer.

The legs of the U-shaped spring can be mounted in an outward-pressing manner in two oppositely located recessed areas of the housing.

The housing can have a rectangular cross section, and the recessed areas for the U-shaped spring can be arranged on the narrower sides of the rectangle.

The shaft head can be formed by a small hand wheel. Instead of this, the shaft head can be outfitted with a slot for a screw driver or with a receptacle for an internal or external polygon.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figures 1A, 1B, 1C, 2A, 2B, 2C, 2D, 2E:
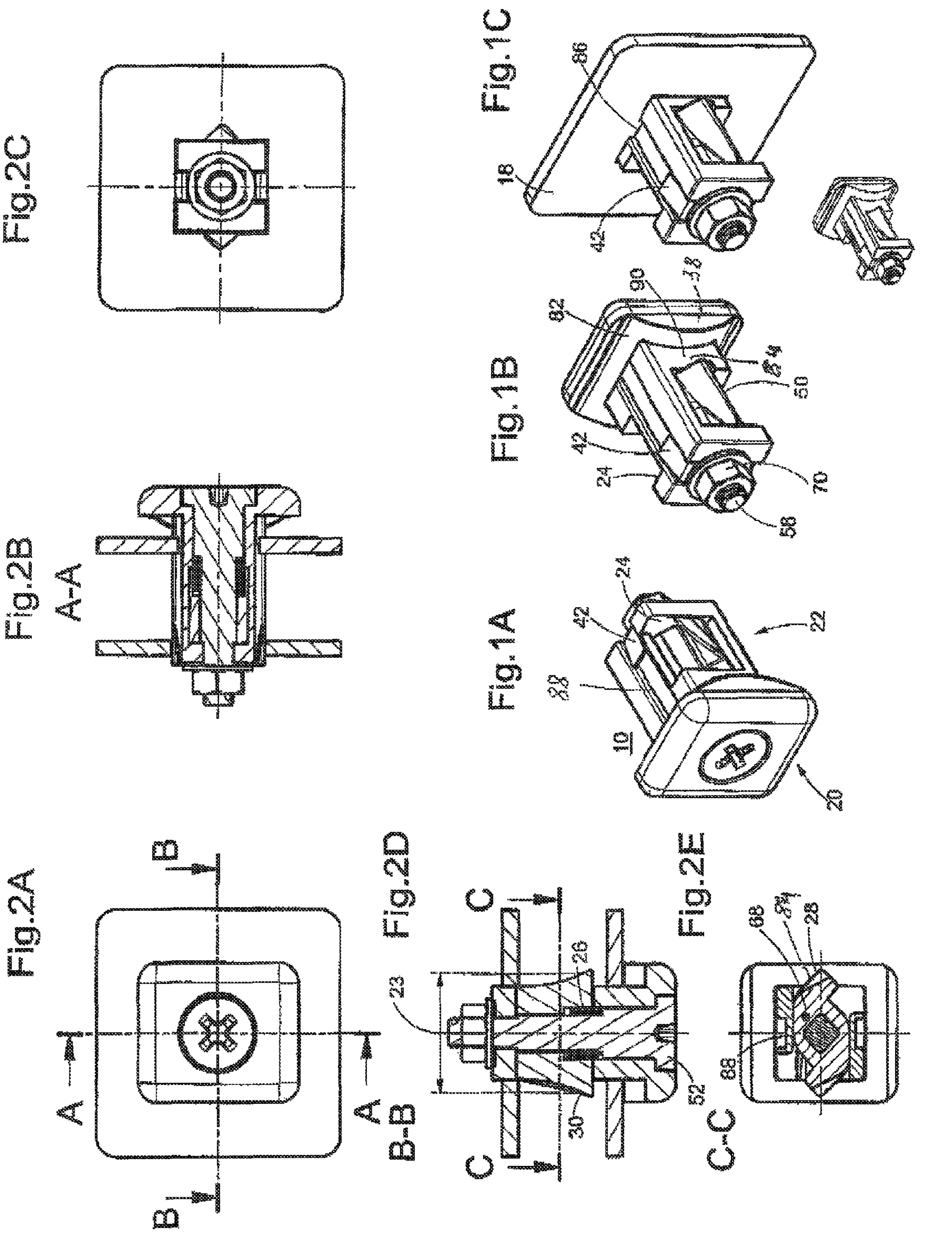
FIG. 1A shows a perspective oblique front view of the snap fastener according to the invention.
FIG. 1B shows a perspective rear view in uninstalled state.
FIG. 1C shows after the base part has been inserted into or through an aperture in a panel.
FIG. 2A shows a front view of the mounted snap fastener.
FIG. 2B shows an axial sectional view (according to FIG. 2A)
FIG. 2C shows a rear view of the arrangement according to FIG. 2A.
FIG. 2D shows an axial sectional view rotated by 90° relative to the view in FIG. 2B.
FIG. 2E shows a section along line C-C of FIG. 2D.

FIG. 1A shows a snap fastener 10 suitable for fastening a first thin wall 18 such as a housing wall, door leaf, shutter, or the like, which is provided with a through-opening 16 to a second thin wall 14 such as a thin-walled wall support such as a housing frame, door frame, wall opening edge, or the like, which is likewise provided with a through-opening 12, having a base part 20 which can be arranged at the first (or second) thin wall 14, 18 in the through-opening 12, 16 thereof, having a head part 22 extending away from this base part, this head part 22 having in its longitudinal section, according to section line 23 shown in FIG. 2D, an extension 23 which initially increases and then decreases again from the end of the head part 22 in direction of the base part 20, which head part 22 presents a male plug-in piece which, by overcoming a spring force acting radially outward in direction of the extension 23 (see spring 26), can be received by an undercut female plug-in piece which is formed by or supported by the through-opening 12 or 16 of the thin wall 14, 18, wherein the head part 22 presents a guide or receptacle 26 for one or two holding elements 28 which are pressed by at least one spring 26 into a position in which they project out over the end of the guide or receptacle 26. The holding elements 28 have a triangular shape in a projection plane extending perpendicular to the thin wall (see the axial section in FIG. 2D) with a diagonal run-in surface (50) and a holding surface (90) which is substantially perpendicular to the latter. The base part 20 is formed by a plate 38 overlapping at least two oppositely located edges (longitudinal edges or transverse edges) of the through-opening in the thin wall 18. The head part 22 is provided as a housing with fastening projections such as leaf spring devices 42 having flexible fastening surfaces 40, which housing 44 can be snapped into a through-opening aperture 12 in the thin wall 14 in such a way that it grips only one thin wall (front panel) and that unlocking devices (releasing means 46) are provided in the housing 44, by means of which unlocking devices the holding elements 26 can be pulled back into the housing 44 from the front, and that the housing 44 can be disengaged from the other thin wall (front panel 18). The dimensions between the holding area of the fastening projections of the holding element on one hand and the support plane of the base part 20 on the other hand are selected in such a way that the fastening projections lie upon the front panel with clearance when the holding elements are pulled back.

Figure 3:
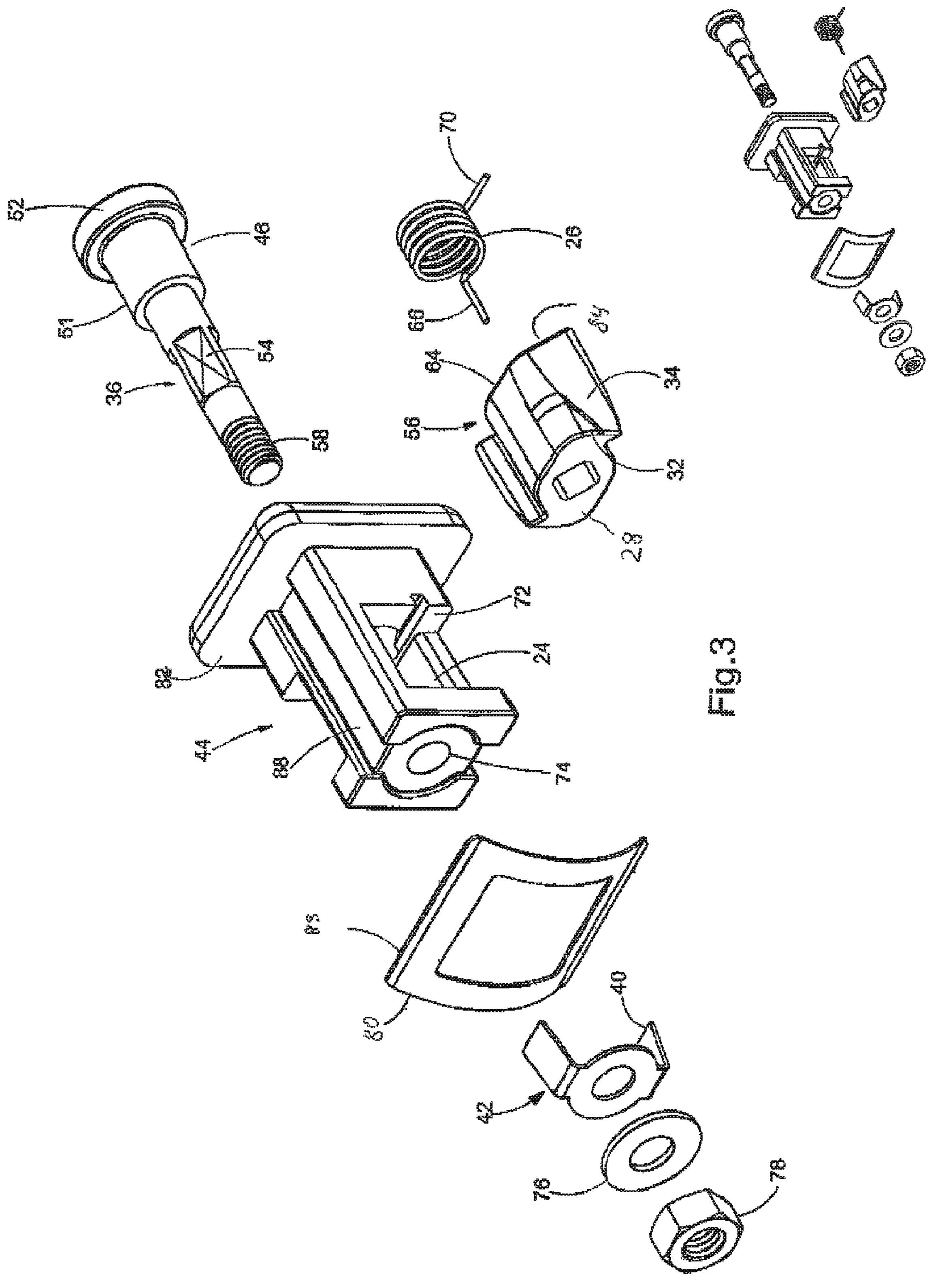
FIG. 3 shows an exploded view of the snap fastener according to the invention.

It is particularly advantageous that the holding elements 28 are formed by the ends 34 of a two-armed lever 56 which is held on a shaft 36 in the housing 44 so as to be rotatable by an angle of approximately 45 degrees against spring force (see FIGS. 3 and 2E). It is also advantageous to provide a spring 26 such as a coil spring enclosing the shaft 36.

The shaft 36 can be formed by a head screw bolt 36 with a pivot bearing surface 51 in the vicinity of the head 52 for rotational bearing support in the base part 20 and the housing 44, with a prism shaped middle region 54 for receiving or supporting the two-armed lever 56 in a rotationally rigid manner, and with a screw thread 58 by means of which a washer 60 can be inserted and a nut 62 screwed on. The screw bolt 36 accordingly connects the housing 44 to the lever 56 which can be inserted into the corresponding receiving space (receptacle 24) of the housing 44 after being inserted into a corresponding cavity 64 in such a way that one end 66 of the spring 26 is received in a bore hole 68 of the lever arm 56, its other end 70 being arranged in a groove 72 in the housing 44. A screw bolt 36 is then inserted through the bore hole 74, the U-shaped leaf spring device 42, the washer 76 and the nut 78 are placed on the screw and the entirety is pulled together until a constructional unit according to FIGS. 1A and 1B results, a rectangular spring washer 80 being placed thereon in such a way that it is located between the support surface 82 of the base part 20 and the associated edge surface 84 of the thin wall 18 after the thin wall 18 has been pushed onto the head part 22 of the snap fastener 10 as is shown in FIG. 1E. The spring 83 causes the base part 20 of the snap fastener 10 to be pushed out somewhat so that the base part 20 can be grasped easily, for example, in order to pull the snap fastener 10 out of the through-opening 16 of the wall surface 18, for which purpose the shaft 36 is rotated by means of a Phillips screw driver, for example, locked according to FIG. 1A, against the force of spring 26 until the lever 28 is pulled back so that it no longer projects over the outer surface of the head part 22. In contrast to through-opening 12, through-opening 16 is provided with a projection 86 which extends into the cavity of through-opening 16 and therefore also into groove 88. This projection 86 does not go past the spring leg of the leaf spring device 42 so that after the head part 22 is inserted into the through-opening 16—insertion is carried out by a yielding of the spring legs of leaf spring device 42—captivity is achieved insofar as the snap fastener 10 which has been inserted into the through-opening 16 can no longer fall out of the through-opening in the thin wall 18.

In case of a plurality of snap fasteners, these snap fasteners are inserted into corresponding bore holes or through-openings 12 in a second thin wall 14, for example, a frame part intended to support the wall 18, in through-openings 12 which are provided in aligned manner. Since these through-openings 12 have no projections 86, removal for disengaging the two shafts of each of the plurality of snap fasteners from one another is not impeded by the U-shaped leaf spring device 42.

Pushing the head part 22 farther into bore hole 12 causes the lever arrangement 56 to rotate against the force of spring 26, namely, in clockwise direction referring to FIG. 2E, due to the diagonally formed latch-like design of the lever 56 until the diagonal end 90 springs out again by rotation of the lever 28 due to the spring force acting at point 68 according to FIG. 2E and exerts a torque in counterclockwise direction. This diagonal surface 90 then secures the second wall 14 to the first wall 18, which is also visible to the observer in that the clearance between the base part 20 and the thin wall 18 which is still visible in FIG. 2B is no longer present; that is, it disappears when pressing in and joining the two thin walls 14, 18.

Therefore, assembly requires only a pressing force, for example, by means of the thumb, on the base part 20 of the fastener 10. To undo the connection, the screw bolt and the shaft 36 are rotated (e.g., by a quarter turn) by means of a tool, in this case, for example, a Phillips screw driver, so that the ends of the lever pull back and the second wall (i.e., the rear wall 14) is released and can be removed. However, the first wall cannot also easily be removed; this is prevented by the U-shaped spring 12.

The head 52 need not necessarily have a Phillips head slot for loosening; rather, a small wheel allowing the shaft 36 to be rotated for purposes of loosening can also be provided. On the other hand, an external polygon like a hexagon socket wrench as well as an internal polygon can also be provided so that a corresponding tool can be placed on or inserted into the latter in order to rotate the lever 28 out of the position shown in FIG. 2E into a position in which the ends of the lever forming the holding elements of the arrangement are swiveled out of the area of the edges of the through-openings 12 and 16.

INDUSTRIAL APPLICABILITY

The invention is industrially applicable in switch cabinet construction.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMBERS

10 snap fastener
12 through-opening
14 thin wall
16 through-opening
18 thin wall, wall support
20 base part
22 head part
23 diameter
24 guide, receptacle
26 spring
28 holding element, lever
30 protruding ends
32 holding surface
34 entry side
36 shaft, screw bolt, head screw bolt
38 plate
40 fastening surfaces
42 leaf spring devices
44 housing
46 releasing means
50 diagonal run-in surface
51 pivot bearing surface
52 head
54 prism-shaped middle region
56 lever, lever arm, lever arrangement, two-armed lever
58 screw thread
64 cavity
66 end
68 bore hole
70 end
72 groove
74 bore hole
76 washer
78 nut
80 spring washer
82 support surface
84 edge surface
86 projection
88 groove
90 diagonal end, diagonal surface

The invention claimed is:

1. A snap fastener suitable for fastening a first thin wall, which is provided with a first through-opening, to a second thin wall, which is provided with a second through-opening, comprising:

a base part configured to be arranged at the first thin wall in the first through-opening;

a head part extending away from the base part, the head part having:

a extension, in a longitudinal section of the head part from an end of the head part in direction of the base part, which initially increases and then decreases again;

a male plug-in piece which, by overcoming a spring force acting radially outward in direction of the extension, is configured to be received by an undercut female plug-in piece which is formed by or supported by the through-opening of the first thin wall; and a guide or receptacle for two holding elements which are pressed by at least one torsional spring into a position in which the holding elements project out over an end of the guide or receptacle;

wherein the diagonal ends of the holding elements have a triangular shape in a projection plane extending perpendicular to the thin wall with a diagonal run-in surface and a holding surface which is substantially perpendicular to the diagonal run-in surface;

wherein the base part is formed by a plate which is configured to at least two oppositely located edges of the through-opening in the first thin wall;

wherein the head part includes a housing with fastening projections having flexible fastening surfaces;

wherein the housing is configured to be snapped into the through-opening in the first thin wall in such a way that the housing grips only one thin wall;

wherein unlocking devices are provided in the housing, the unlocking devices being configured to pull the holding elements back into the housing from the front, so that the housing can be disengaged from the other thin wall;

wherein dimensions between a holding area of the fastening projections and a holding area of the holding elements on one hand, and the support plane of the base part on the other hand, are selected in such a way that the fastening projections lie upon the front panel with clearance when the holding elements are pulled back; and wherein the holding elements are formed by ends of a two-armed lever which is held on a shaft in the housing so as to be rotatable at an angle of approximately 45 to 90 degrees against spring force, wherein the shaft is formed by a head screw bolt with a pivot bearing surface in a vicinity of the head for rotational bearing support in the base part, with a prism-shaped middle region for mounting the two-armed lever a rotationally rigid manner, and with an external screw thread at the base part for receiving a nut.

2. The snap fastener according to claim 1;

wherein a spring extending around the shaft is provided for generating the spring force; and wherein one end of the spring is fixed in a bore hole arranged in a vicinity of the shaft, while the other end of the spring is fixed in the housing supporting the shaft.

3. The snap fastener according to claim 1;

wherein a spring washer is configured to be arranged between the support surface of the base part and an associated edge plane of the thin wall.

4. The snap fastener according to claim 1;

wherein the nut holds a U-shaped leaf spring device by means of a washer.

5. The snap fastener according to claim 1;

wherein the legs of a U-shaped leaf spring device are mounted in an outward-pressing manner in two oppositely located recessed areas of the housing.

6. The snap fastener according to claim 5;

wherein projections emerging from an edge of the through-opening of the outer wall project into the recessed area when the snap fastener is installed in the through-opening.

7. The snap fastener according to claim 5;

wherein the housing has a rectangular cross section, and the recessed areas for the U-shaped leaf spring device are arranged on the narrower sides of the rectangle.

8. The snap fastener according to claim 1;

wherein the head is formed by a small hand wheel.

9. The snap fastener according to claim 1;

wherein the head is instead outfitted with a slot for a screw driver with a receptacle for an internal or external polygon.

10. A snap fastener suitable for fastening a first thin wall, which is provided with a first through-opening, to a second thin wall, which is provided with a second through-opening, comprising:

a base part configured to be arranged at the first thin wall in the first through-opening;

a head part extending away from the base part, the head part having:

a extension, in a longitudinal section of the head part from an end of the head part in direction of the base part, which initially increases and then decreases again;

a male plug-in piece which, by overcoming a spring force acting radially outward in direction of the extension, is configured to be received by an undercut female plug-in piece which is formed by or supported by the through-opening of the first thin wall; and a guide or receptacle for two holding elements which are pressed by at least one torsional spring into a position in which the holding elements project out over an end of the guide or receptacle;

wherein the diagonal ends of the holding elements have a triangular shape in a projection plane extending perpendicular to the thin wall with a diagonal run-in surface and a holding surface which is substantially perpendicular to the diagonal run-in surface;

wherein the base part is formed by a plate which is configured to at least two oppositely located edges of the through-opening in the first thin wall;

wherein the head part includes a housing with fastening projections having flexible fastening surfaces;

wherein the housing is configured to be snapped into the through-opening in the first thin wall in such a way that the housing grips only one thin wall;

wherein unlocking devices are provided in the housing, the unlocking devices being configured to pull the holding elements back into the housing from the front, so that the housing can be disengaged from the other thin wall;

wherein dimensions between a holding area of the fastening projections and a holding area of the holding elements on one hand, and the support plane of the base part on the other hand, are selected in such a way that the fastening projections lie upon the front panel with clearance when the holding elements are pulled back;

wherein the holding elements are formed by ends of a two-armed lever which is held on a shaft in the housing so as to be rotatable at an angle of approximately 45 to 90 degrees against spring force, wherein the legs of a U-shaped leaf spring device are mounted in an outward-pressing manner in two oppositely located recessed areas of the housing, and wherein the housing has a rectangular cross section, and the recessed areas for the U-shaped leaf spring device are arranged on the narrower sides of the rectangle.

11. The snap fastener according to claim 10;

wherein a spring extending around the shaft is provided for generating the spring force; and wherein one end of the spring is fixed in a bore hole arranged in a vicinity of the shaft, while the other end of the spring is fixed in the housing supporting the shaft.

12. The snap fastener according to claim 10;

wherein a spring washer is configured to be arranged between the support surface of the base part and an associated edge plane of the thin wall.

13. The snap fastener according to claim 10;

wherein the shaft is formed by a head screw bolt with a pivot bearing surface in a vicinity of the head for rotational bearing support in the base part, with a prism-shaped middle region for mounting the two-armed lever a rotationally rigid manner, and with an external screw thread at the base part for receiving a nut.

14. The snap fastener according to claim 13;

wherein, the nut holds a U-shaped leaf spring device by means of a washer.

15. The snap fastener according to claim 10;

wherein the legs of a U-shaped leaf spring device are mounted in an outward-pressing manner in two oppositely located recessed areas of the housing.

16. The snap fastener according to claim 15;

wherein projections emerging from an edge of the through-opening of the outer wall project into the recessed area when the snap fastener is installed in the through-opening.

17. The snap fastener according to claim 15;

wherein the housing has a rectangular cross section, and the recessed areas for the U-shaped leaf spring device are arranged on the narrower sides of the rectangle.

18. The snap fastener according to claim 10;

wherein the head is formed by a small hand wheel.

19. The snap fastener according to claim 10;

wherein the head is instead outfitted with a slot for a screw driver with a receptacle for an internal or external polygon.

* * * * *